US012768152B2

(12) United States Patent
Cochart

(10) Patent No.: US 12,768,152 B2
(45) Date of Patent: Oct. 20, 2026

(54) ELECTROMECHANICAL SHOWER VALVE

(71) Applicant: Kohler Co., Kohler, WI (US)

(72) Inventor: Chad J. Cochart, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 482 days.

(21) Appl. No.: 18/360,388

(22) Filed: Jul. 27, 2023

(65) Prior Publication Data

US 2024/0052613 A1 Feb. 15, 2024

Related U.S. Application Data

(60) Provisional application No. 63/396,346, filed on Aug. 9, 2022.

(51) Int. Cl.

| | |
|---|---|
| ***E03C 1/04*** | (2006.01) |
| ***E03C 1/05*** | (2006.01) |
| ***F16K 11/00*** | (2006.01) |
| ***F16K 31/06*** | (2006.01) |

(52) U.S. Cl.

CPC ............ *E03C 1/0409* (2013.01); *E03C 1/055* (2013.01); *F16K 19/006* (2013.01); *F16K 31/0675* (2013.01); *E03C 2201/30* (2013.01); *F16K 2200/50* (2021.08); *Y10T 137/6007* (2015.04); *Y10T 137/6014* (2015.04); *Y10T 137/6017* (2015.04); *Y10T 137/6021* (2015.04); *Y10T 137/6024* (2015.04); *Y10T 137/6977* (2015.04); *Y10T 137/87249* (2015.04); *Y10T 137/9464* (2015.04)

(58) Field of Classification Search

CPC ......... Y10T 137/6014; Y10T 137/6017; Y10T 137/6021; Y10T 137/6024; Y10T 137/9464; Y10T 137/6977; Y10T 137/87249; Y10T 137/6007; F16K 19/006; F16K 31/0675; F16K 2200/50; F16K 2200/501; E03C 1/023; E03C 1/0408; E03C 1/0409; E03C 1/055; E03C 1/057; E03C 2201/30

USPC .................................................. 137/597, 801

See application file for complete search history.

(56) References Cited

U.S. PATENT DOCUMENTS

| | | | | |
|---|---|---|---|---|
| 5,121,511 A | | 6/1992 | Sakamoto et al. | |
| 5,172,713 A | * | 12/1992 | Hall | F16K 11/24 251/38 |
| 5,197,511 A | * | 3/1993 | Kohn | F16L 37/60 251/149.6 |

(Continued)

*Primary Examiner* — Matthew W Jellett

(74) *Attorney, Agent, or Firm* — Foley & Lardner LLP

(57) ABSTRACT

A system for converting a mechanical main valve body of a shower assembly to an electromechanical main valve body. The system includes a mechanical valve body that includes a cold water inlet, a hot water inlet, and a connection interface that interchangeably receives one of the mechanical main valve body or the electromechanical main valve body. The electromechanical main valve body includes a first solenoid valve fluidly coupled to a first outlet that directs the mixed water to a first user device in replacement of a second outlet of the mechanical main valve body, and a second solenoid valve fluidly coupled to a third outlet that directs the mixed water to a second user device in replacement of a fourth outlet of the mechanical main valve body. The first and second solenoid valves selectively permit the mixed water to flow through the first and third outlets, respectively.

20 Claims, 20 Drawing Sheets

(56) References Cited

U.S. PATENT DOCUMENTS

| | | | | |
|---|---|---|---|---|
| 5,888,623 | A | 3/1999 | Katzer | |
| 5,944,255 | A | 8/1999 | Shirmohamadi | |
| 7,584,898 | B2 * | 9/2009 | Schmitt | G05D 23/1393 236/12.12 |
| 7,665,483 | B1 | 2/2010 | Sid | |
| 8,479,761 | B2 | 7/2013 | Yang | |
| 8,505,576 | B2 * | 8/2013 | Renninger | F16K 27/003 251/367 |
| D698,011 | S | 1/2014 | Schoenherr et al. | |
| D698,012 | S | 1/2014 | Schoenherr et al. | |
| 8,627,844 | B2 * | 1/2014 | Allen | E03C 1/042 403/DIG. 1 |
| D699,817 | S | 2/2014 | Schoenherr et al. | |
| D700,293 | S | 2/2014 | Schoenherr et al. | |
| 8,950,730 | B2 | 2/2015 | Bedolla et al. | |
| 9,334,971 | B2 * | 5/2016 | Brouwer | F16K 19/006 |
| 9,470,336 | B2 | 10/2016 | Huffington et al. | |
| D774,169 | S | 12/2016 | Kington et al. | |
| 9,632,514 | B2 | 4/2017 | Marty et al. | |
| 9,650,768 | B2 | 5/2017 | Johnson et al. | |
| 9,758,951 | B2 | 9/2017 | Evans et al. | |
| 9,910,578 | B2 | 3/2018 | Freier et al. | |
| 10,081,932 | B2 | 9/2018 | Seggio et al. | |
| 10,138,622 | B2 | 11/2018 | Thomas et al. | |
| 10,413,917 | B2 | 9/2019 | Rexach et al. | |
| 10,480,165 | B2 | 11/2019 | Reeder et al. | |
| 10,626,583 | B2 | 4/2020 | Mazz et al. | |
| 10,663,075 | B2 | 5/2020 | Wang et al. | |
| 11,203,856 | B2 | 12/2021 | Li et al. | |
| 11,213,833 | B2 | 1/2022 | Rexach et al. | |
| 2006/0231140 | A1 * | 10/2006 | McNerney | E03C 1/021 137/360 |
| 2013/0075483 | A1 | 3/2013 | Marty et al. | |
| 2020/0109542 | A1 | 4/2020 | Mavinahally et al. | |
| 2020/0263400 | A1 | 8/2020 | Song et al. | |
| 2021/0388584 | A1 | 12/2021 | Thomas et al. | |

* cited by examiner

ELECTROMECHANICAL SHOWER VALVE

CROSS-REFERENCE TO RELATED APPLICATION

This application claims the benefit of and priority to U.S. Provisional Patent Application No. 63/396,346, filed Aug. 9, 2022, which is incorporated herein by reference in its entirety.

BACKGROUND

The present disclosure relates generally to a shower assembly. More specifically, the present disclosure relates to a shower assembly adaptable for use with a mechanical main valve body and an electromechanical main valve body.

Traditionally, a shower assembly comes with a fixed main valve body type, typically a mechanical main valve body or an electromechanical main valve body. However, the fixed main valve body type that the shower assembly is preconfigured with is irreplaceable. For example, a shower assembly preconfigured with the mechanical main valve body cannot readily be altered to replace the mechanical main valve body with the electromechanical main valve body.

Traditionally, the shower assembly is limited to a number of user devices that is equal to a number of outlets included in a main valve body. For example, a shower assembly with a main valve body that includes two outlets is limited to fluidly coupling to two user devices or less.

SUMMARY

At least one embodiment relates to a shower assembly. The shower assembly includes a mechanical valve body having a cold water inlet configured to receive cold water and a hot water inlet configured to receive hot water and a connection interface configured to interchangeably receive one of a mechanical main valve body and an electromechanical main valve body. The mechanical main valve body includes a first base sealingly engageable with the connection interface, a first mixing valve configured to receive the cold water and the hot water and facilitate a mixing of the cold water and the hot water, a first drive coupled to the first mixing valve and configured to control the mixing of the cold water and the hot water in the first mixing valve, a first outlet configured to direct the mixed water to a first user device, and a second outlet configured to direct the mixed water to a second user device. The electromechanical main valve body includes a second base sealingly engageable with the connection interface, a second mixing valve configured to receive the cold water and the hot water and facilitate a mixing of the cold water and the hot water, a second drive coupled to the second mixing valve and configured to control the mixing of the cold water and the hot water in the second mixing valve, a third outlet configured to direct the mixed water to the first user device, a fourth outlet configured to direct the mixed water to the second user outlet, a first solenoid valve fluidly coupled to the third outlet and configured to selectively permit mixed water to flow through the third outlet, and a second solenoid valve fluidly coupled to the fourth outlet and configured to selectively permit mixed water to flow through the fourth outlet. The first shower assembly further includes a first cover assembly. The first cover assembly includes a battery compartment configured to receive one or more batteries operable to provide an electric power to the first solenoid valve and the second solenoid valve. The first cover assembly further includes an escutcheon plate and a control module. The control module is configured to selectively control a delivery of the electric power from the batteries to the first solenoid valve and the second solenoid valve.

Another example embodiment relates to a system for converting a mechanical main valve body of a shower assembly to an electromechanical main valve body. The system includes a mechanical valve body that includes a cold water inlet that receives cold water, a hot water inlet that receives hot water, and a connection interface that interchangeably receives one of the mechanical main valve body or the electromechanical main valve body. The electromechanical main valve body is couplable to the mechanical valve body. The electromechanical main valve body includes a first solenoid valve fluidly coupled to a first outlet that directs the mixed water to a first user device in replacement of a second outlet of the mechanical main valve body. The first solenoid valve selectively permits the mixed water to flow through the first outlet. The electromechanical main valve body further includes a second solenoid valve fluidly coupled to a third outlet that directs the mixed water to a second user device in replacement of a fourth outlet of the mechanical main valve body. The second solenoid valve selectively permits the mixed water to flow through the third outlet Another example embodiment relates to an outlet addition assembly. The outlet addition assembly includes a first inlet configured to be coupled to an outlet of a main valve body, a first additional outlet fluidly coupled to the first inlet and to a first user device, a second additional outlet fluidly coupled to the first inlet and to a third user device, and a solenoid valve and diverter module fluidly coupled to the first inlet 202, the first additional outlet 204, and the second additional outlet 206. The solenoid valve and diverter module is configured to facilitate directing water through the outlet addition assembly. The solenoid valve and diverter module includes a third solenoid valve disposed between the first additional outlet and the second additional outlet and configured to receive mixed water from the first inlet and selectively permit mixed water to flow through the first additional outlet and the second additional outlet.

Another example embodiment relates to a second shower assembly. The second shower assembly comprises an outlet expansion module. The outlet expansion module includes a second inlet configured to intake mixed water from a water source or a main valve body, a fifth outlet fluidly coupled to a fifth solenoid valve and configured to direct mixed water to a fourth user device, a sixth outlet fluidly coupled to a sixth solenoid valve and configured to direct mixed water to a fifth user device, and a seventh outlet fluidly coupled to a seventh solenoid valve and configured to direct mixed water to a sixth user device.

This summary is illustrative only and should not be regarded as limiting.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1:
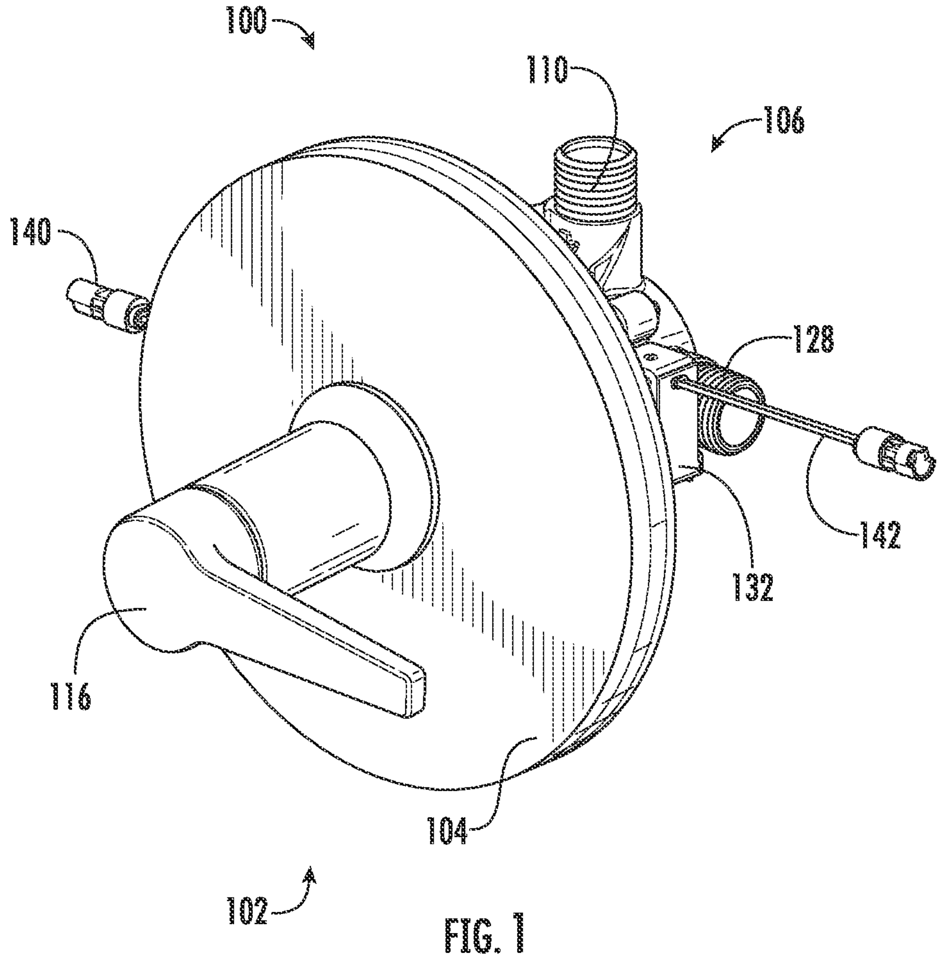
FIG. 1 is a front perspective view of a first shower assembly including a valve assembly and an electromechanical main valve body, according to an example embodiment.

Before turning to the FIGURES, which illustrate certain exemplary embodiments in detail, it should be understood that the present disclosure is not limited to the details or methodology set forth in the description or illustrated in the FIGURES. It should also be understood that the terminology used herein is for the purpose of description only and should not be regarded as limiting.

Referring generally to the FIGURES, a first shower assembly 100 is disclosed according to various embodiments. The first shower assembly 100 is configured for use in a home environment, such as a bathroom. The first shower assembly 100 includes a valve assembly having a mechanical valve body. The mechanical valve body can be a mobile (e.g., portable, etc.) mechanical valve body or an in-situ mechanical valve body that is fixed to a wall and possibly connected to water lines (e.g., pipes, etc.). The valve assembly includes two main valve bodies (e.g., top works) that can be coupled to the mechanical valve body individually, with no/minor disruptions to the wall and the water lines. The first main valve body is a mechanical main valve body that allows the shower assembly 100 to function as a typical mechanical mixing valve that controls a water flow through outlets mechanically. The second main valve body is an electromechanical main valve body that allows the shower assembly 100 to function as a self-contained and battery-powered electromechanical mixing valve that controls the water flow through outlets electromechanically.

Referring generally to the FIGURES, an outlet addition assembly 200 is disclosed according to various embodiments. The outlet addition assembly 200 is configured for use in a home environment, such as a bathroom. The outlet addition assembly 200 includes a solenoid valve and diverter module that, when fluidly coupled to an outlet of the main valve body (e.g., the mechanical main valve body and the electromechanical main valve body), functionally increases a number of outlets in the main valve body by one. For example, a main valve body with two outlets functionally increases to having three outlets, when one outlet of the main valve body is fluidly coupled to the solenoid valve and diverter module.

Referring generally to the FIGURES, a second shower assembly 300 is disclosed according to various embodiments. The second shower assembly 300 is configured for use in a home environment, such as a bathroom. Similar to the electromechanical main valve body of the first shower assembly 100, the second shower assembly 300 functions electromechanically. The second shower assembly 300 includes an outlet expansion module having three outlets. When the outlet expansion module is fluidly coupled to an outlet of the main valve body, the outlet expansion module functionally increases the number of outlets in the main valve body by two. For example, a main valve body with two outlets functionally increases to having four outlets, when one outlet of the main valve body is fluidly coupled to the outlet expansion module. In other embodiments, the outlet expansion module includes more than three outlets, resulting in functionally increasing the number of outlets in the main valve body by more than two when one outlet of the main valve body is fluidly coupled to the outlet expansion module.

Referring to FIGS. 1-5, a first shower assembly 100 is shown, according to an example embodiment. The first shower assembly 100 facilitates water control within a bathroom shower. In some embodiments, the first shower assembly 100 is substantially free of wiring to an external power source. In some embodiments, the first shower assembly 100 is operable to be installed as a self-contained wireless unit entirely within a wall of a shower compartment. The first shower assembly 100 includes a first cover assembly 102 (e.g., cover assembly 102). The cover assembly 102 is disposed a long a front portion of the first shower assembly 100 and configured to provide a method (e.g., interface, a means for, etc.) for a user to communicate with the first shower assembly 100. The cover assembly 102 includes a first escutcheon plate 104 (e.g., escutcheon plate 104). The escutcheon plate 104 is disposed along a front portion of the cover assembly 102 and partially covers and/or protects other components of the first shower assembly 100.

The first shower assembly 100 further includes a valve assembly 106. The valve assembly 106 is disposed along a rear portion of the first shower assembly 100 and coupled to the cover assembly 102. The valve assembly 106 is configured to intake and direct water within the bathroom shower. The valve assembly 106 includes a mechanical valve body 108 configured to intake water. The mechanical valve body 108 includes a cold water inlet 110 disposed along an upper portion of the mechanical valve body 108. The cold water inlet 110 is configured to intake a cold water from a cold water source. The mechanical valve body 108 also includes a hot water inlet 112 disposed along a lower portion of the mechanical valve body 108. The hot water inlet 112 is configured to intake a hot water from a hot water source. The mechanical valve body 108 further includes a connection interface 114 facilitates an interchangeable connection between the mechanical valve body 108 and a main valve body. In some embodiments, the mechanical valve body 108 is an in-situ mechanical valve body, such that the main valve body can be replaced without removing or replacing the in-situ mechanical valve body.

Figure 3A:
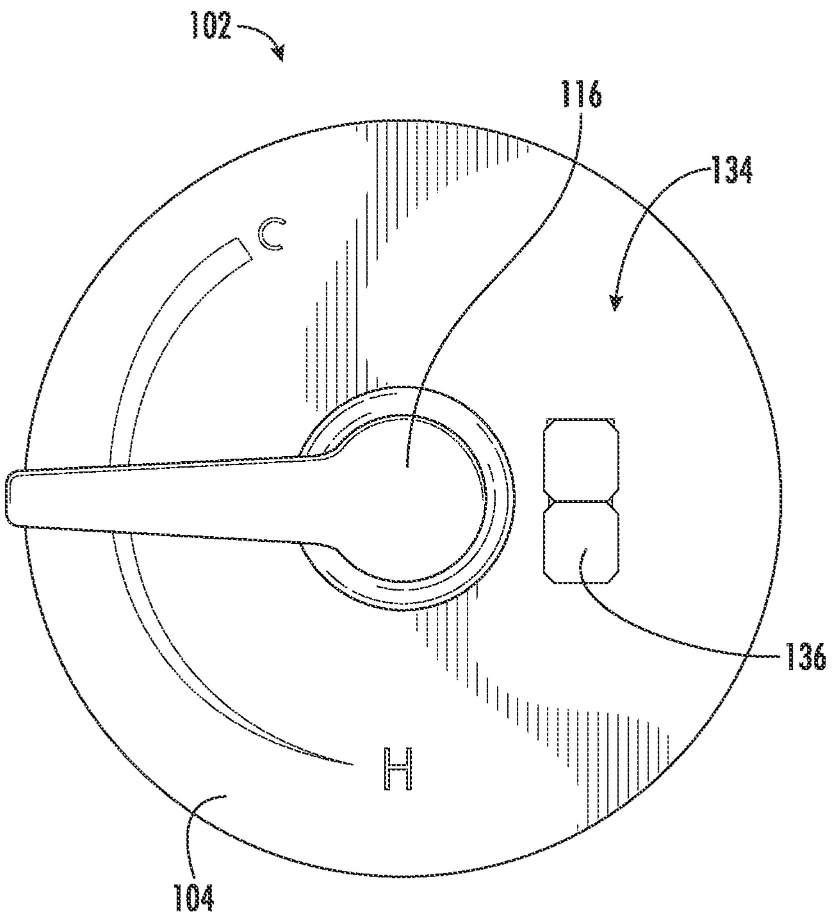
FIG. 3A is a front view of the first shower assembly, according to another example embodiment.
Figure 3B:
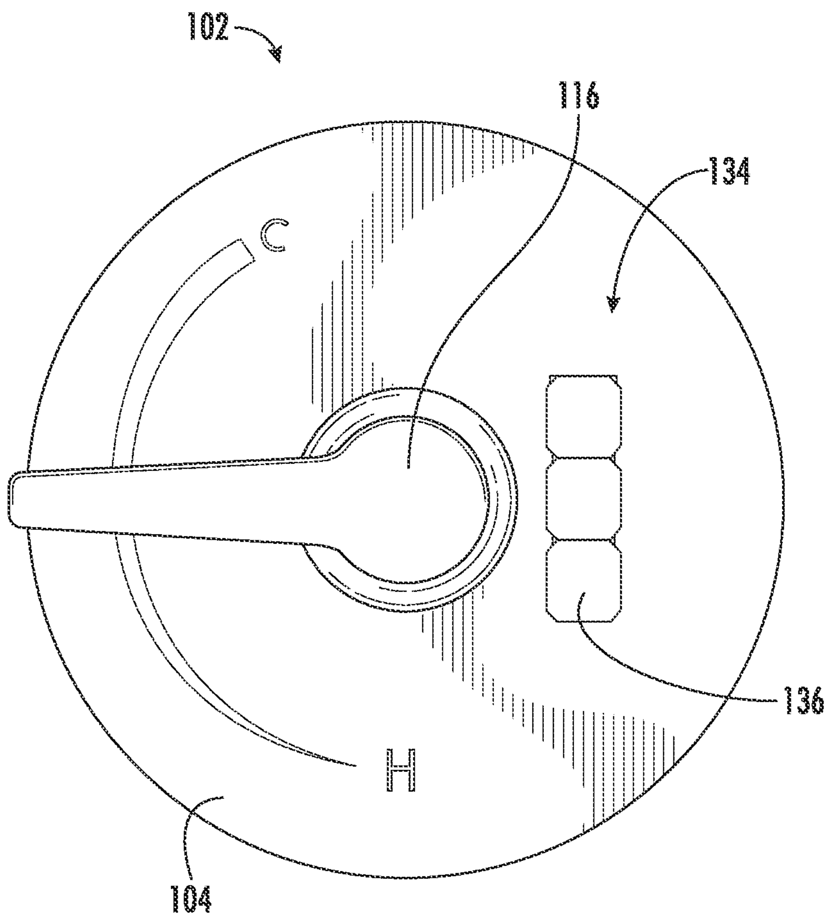
FIG. 3B is a front view of the first shower assembly, according to yet another example embodiment.
Figure 4A:
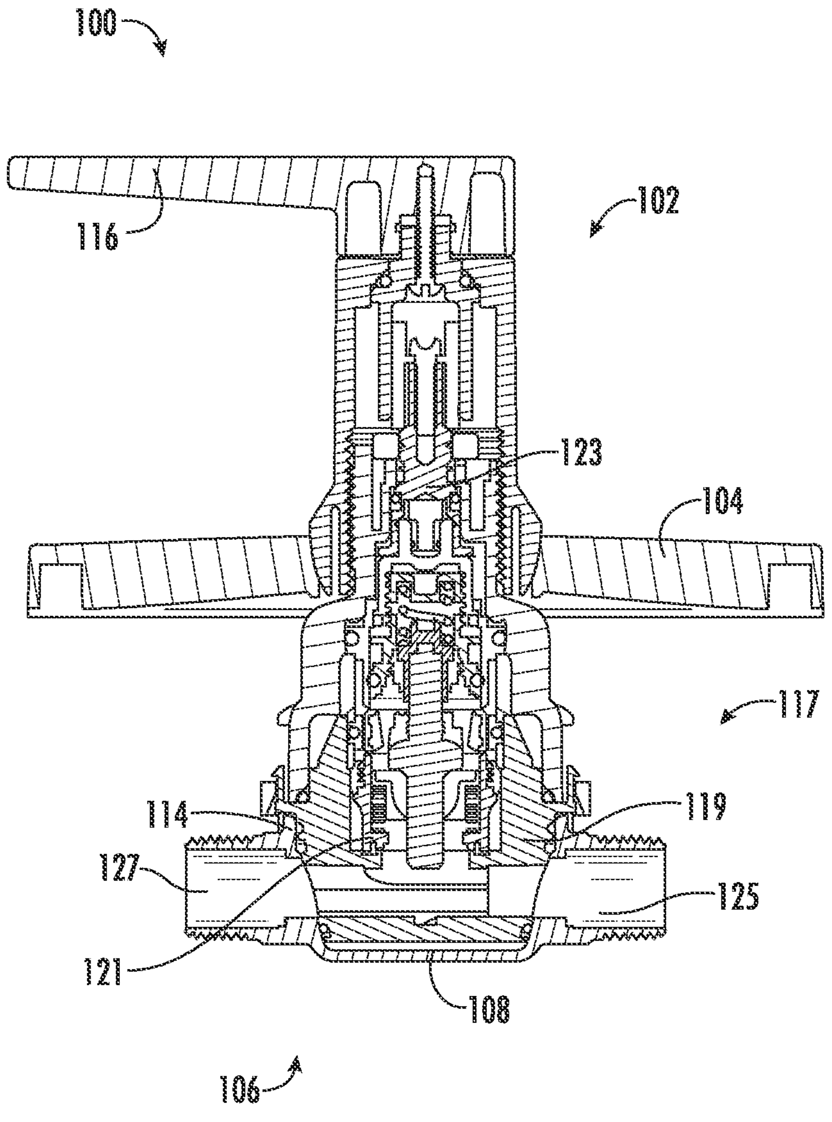
FIG. 4A is a cross-sectional view of a first shower assembly including a mechanical main valve body, according to an example embodiment.

In some embodiments, shown in FIG. 4A, the valve assembly 106 includes a mechanical main valve body 117. The mechanical main valve body 117 is configured to facilitate a water outtake of the first shower assembly 100. The mechanical main valve body 117 includes a first base 119 (e.g., base 119) that couples to the mechanical main valve body 117 to the mechanical valve body 108 via the connection interface 114. The base 119 is sealingly engageable with the connection interface 114. The mechanical main valve body 117 includes a first mixing valve 121 (e.g., mixing valve 121). The mixing valve 121 is coupled to an inside of the mechanical main valve body 117 and configured to facilitate a mixing of the cold water from the cold water inlet 110 and the hot water from the hot water inlet 112. The mechanical main valve body 117 includes a first drive 123 (e.g., drive 123). The drive 123 is coupled to an inside of the mixing valve 121 and configured to control the mixing of the cold water and the hot water. The cover assembly 102 includes a lever 116, shown in FIGS. 1-4B. The lever 116 is coupled to the drive 123 such that the user can interact (e.g., rotate, push, pull, etc.) with the lever 116 to control the drive 123, thereby controlling the mixing of the cold water and the hot water. The mechanical main valve body further includes a first outlet 125. The first outlet 125 is coupled to the mechanical valve body 108 and is fluidly coupled to a first user device (e.g., showerhead, tub spout, handshower, shower panel, etc.). The first outlet 125 is configured to direct mixed water from the mixing valve 121 to the first user device via a hydraulic connection (e.g., hose, pipe, etc.). The mechanical main valve body further includes a second outlet 127. The second outlet 127 is coupled to the mechanical valve body 108 and is fluidly coupled to a second user device. The second outlet 127 is configured to direct mixed water from the mixing valve 121 to the second user device via a hydraulic connection. In some embodiments, the first outlet 125 is fluidly coupled to a tub spout having a spout diverter. The spout diverter is configured between an open position, where water is allowed to flow from the first outlet 125 through the tub spout, and a closed position, where water is prevented from flowing from the first outlet 125 through the tub spout. When the spout diverter is in the closed position, the water is allowed to flow through the second outlet 127.

In some embodiments, shown in FIGS. 1, 2, 4B, and 5A-5C, the valve assembly 106 includes an electromechanical main valve body 118. The electromechanical main valve body 118 is configured to facilitate the water outtake of the first shower assembly 100. The electromechanical main valve body 118 includes a second base 120 (e.g., base 120) that is functionally similar to the first base 119 and couples the electromechanical main valve body 118 to the mechanical valve body 108 via the connection interface 114. The electromechanical main valve body 118 includes a second mixing valve 122 (e.g., mixing valve 122) that is functionally similar to the first mixing valve 121. The mixing valve 122 is coupled to an inside of the electromechanical main valve body 118. The electromechanical main valve body 118 includes a second drive 124 (e.g., drive 124) that is functionally similar to the first drive 123. The drive 124 is coupled to an inside of the mixing valve 122. The lever 116 couples to the drive 124 such that the user can interact with the lever 116 to control the drive 124, thereby controlling the mixing of the cold water and the hot water. The electromechanical main valve body 118 further includes a third outlet 126. The third outlet 126 is coupled to the mechanical valve body 108 and is fluidly coupled to the first user device. The third outlet 126 is configured to direct mixed water from the mixing valve 122 to the first user device via a hydraulic connection. The electromechanical main valve body 118 also includes a fourth outlet 128. The fourth outlet 128 is coupled to the mechanical valve body 108 and is fluidly coupled to the second user device. The fourth outlet 128 is configured to direct mixed water from the mixing valve 122 to the second user device via a hydraulic connection.

Figure 4B:
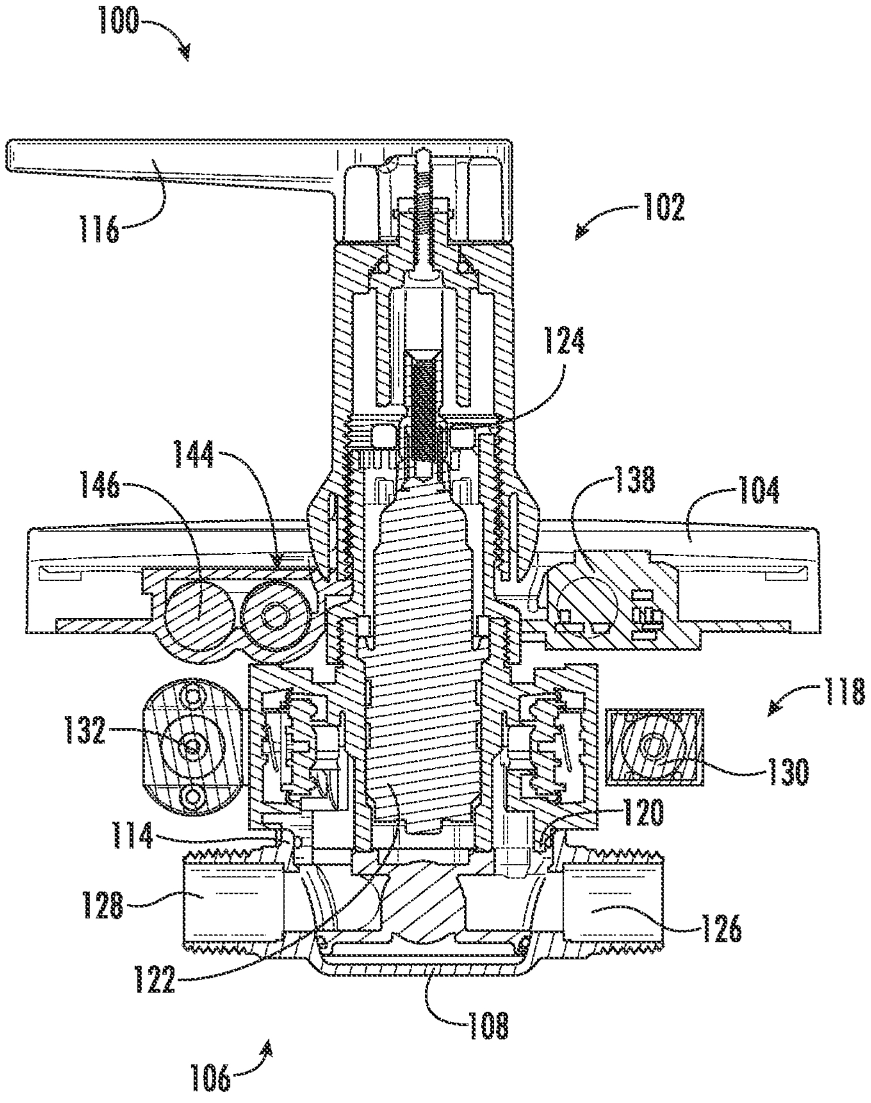
FIG. 4B is a cross-sectional view of the first shower assembly of FIGS. 1 and 2 including the electromechanical main valve body, according to an example embodiment.
Figure 5A:
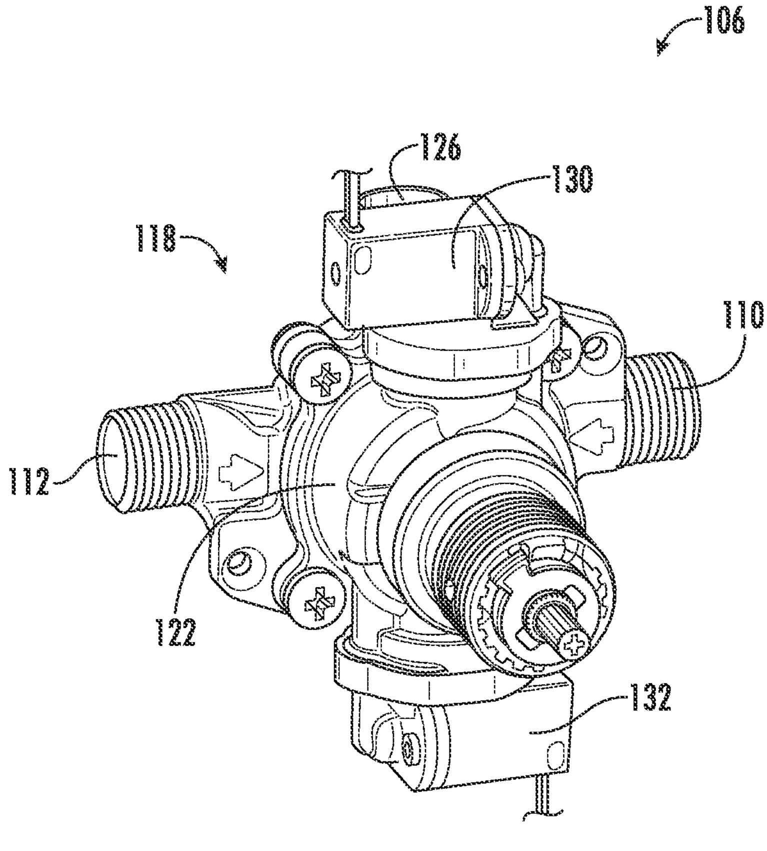
FIG. 5A is a front perspective view of the valve assembly of FIGS. 1, 2 and 4B, according to an example embodiment.
Figure 5B:
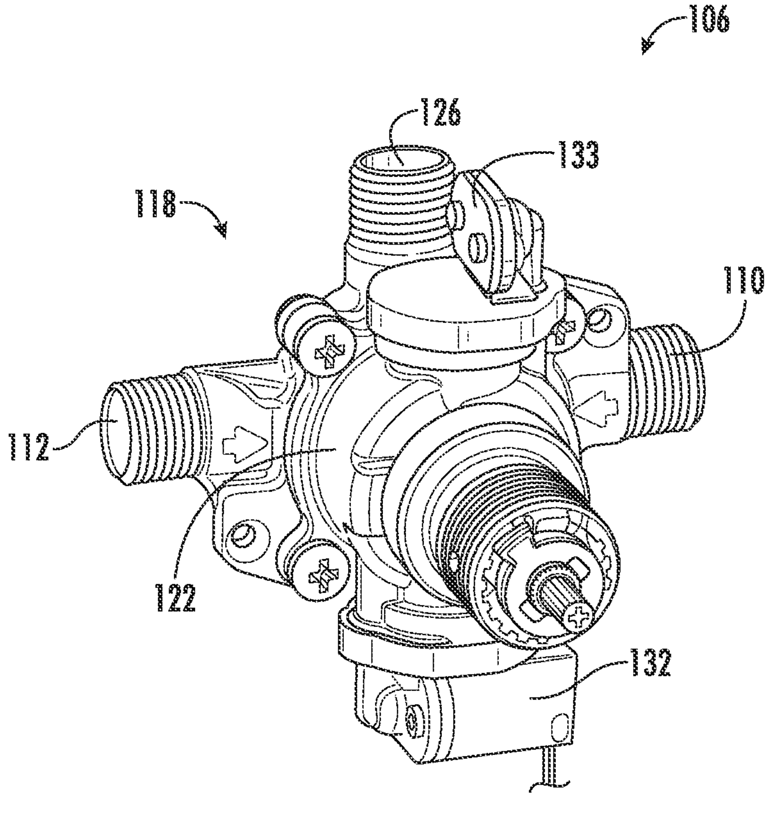
FIG. 5B is a front perspective view of the valve assembly, according to another example embodiment.
Figure 5C:
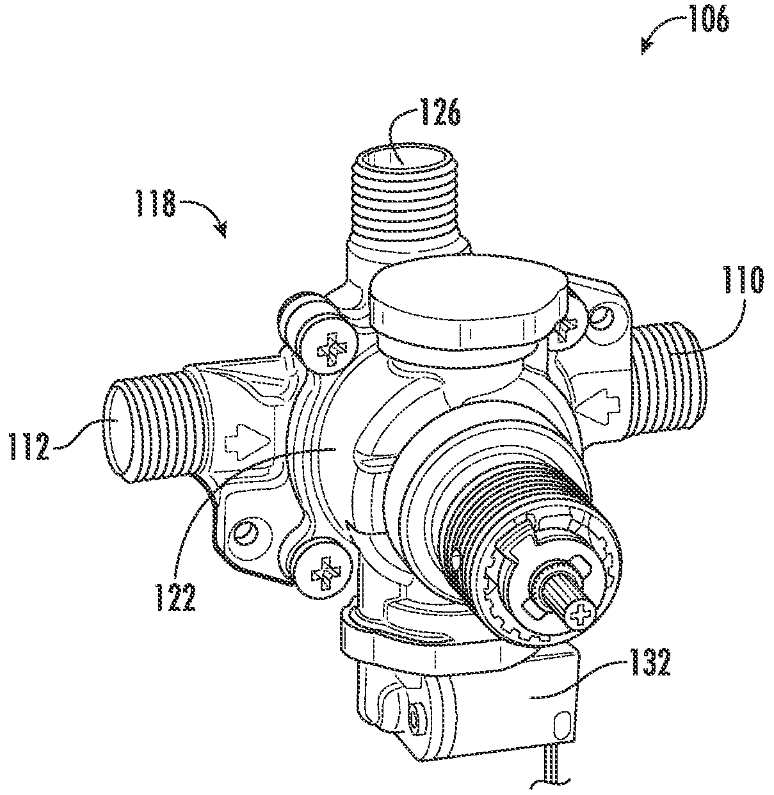
FIG. 5C is a front perspective view of the valve assembly, according to yet another example embodiment.

Still referring to FIGS. 1, 2, 4B, and 5A-5C, the electromechanical main valve body 118 may include a first solenoid valve 130 (e.g., solenoid valve 130). The solenoid valve 130 is coupled to an outside of the mixing valve 122 and is fluidly coupled to the third outlet 126. The solenoid valve 130 is configured to selectively permit mixed water to flow through the third outlet 126. For example, (i) when the solenoid valve 130 is in a closed position, mixed water is prevented from flowing through the third outlet 126, and (ii) when the solenoid valve 130 is in an open position, mixed water is allowed to flow through the third outlet 126. The electromechanical main valve body 118 may include a second solenoid valve 132 (e.g., solenoid valve 132). The solenoid valve 132 is coupled to an outside of the mixing valve 122 and is fluidly coupled to the fourth outlet 128. The solenoid valve 132 is configured to selectively permit mixed water to flow through the fourth outlet 128. For example, (i) when the solenoid valve 132 is in a closed position, mixed water is prevented from flowing through the fourth outlet 128, and (ii) when the solenoid valve 132 is in an open position, mixed water is allowed to flow through the fourth outlet 128. In some embodiments, shown in FIGS. 4B and 5A, the electromechanical main valve body 118 may include both the first solenoid valve 130 and the second solenoid valve 132. In other embodiments, as shown in FIGS. 5B and 5C, the electromechanical main valve body 118 may include only the solenoid valve 132. In yet other embodiments, as shown in FIG. 5B, the electromechanical main valve body 118 may include a solenoid mount 133 configured to couple to the solenoid valve 130, such that the electromechanical main valve body 118 is selectively configured to include (i) both of the solenoid valves 130, 132 or (ii) only the solenoid valve 130.

Figure 2:
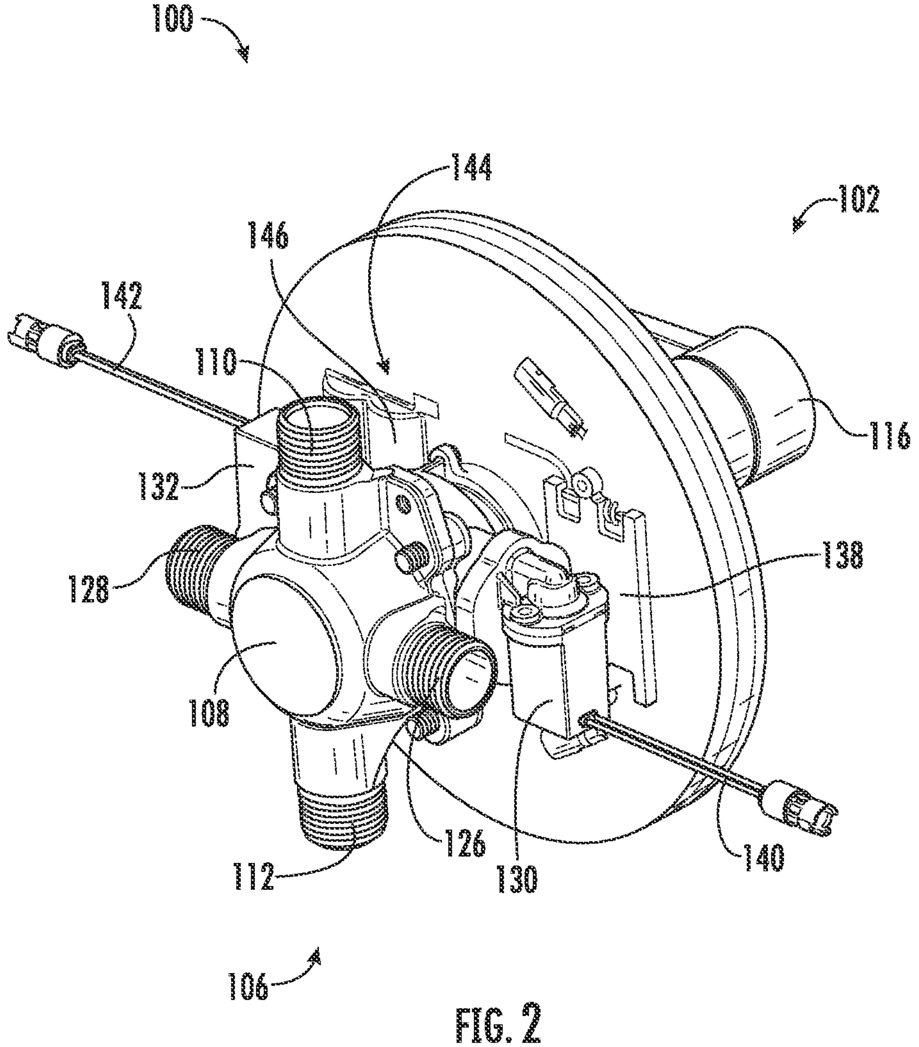
FIG. 2 is a rear perspective view of the first shower assembly of FIG. 1, according to an example embodiment.

Referring to FIGS. 3A and 3B, in some embodiments, the escutcheon plate 104 includes a first user interface 134 (e.g., user interface 134). The user interface 134 is disposed along a front portion of the escutcheon plate 104 and configured to provide the user with a method to communicate with the first shower assembly 100. The user interface 134 includes first buttons 136, e.g., buttons 136 (e.g., membrane switches, capacitive switches, etc.). The buttons 136 are coupled to the escutcheon plate 104 and configured to provide the user with an option to switch between mixed water outlets of the electromechanical main valve body 118 (e.g., the third outlet 126 and the fourth outlet 128). In some embodiments, the user interface 134 includes two buttons 136 (shown in FIG. 3A). In this embodiment, one button 136 is configured to direct water to the first user device, where the first user device is a showerhead, and another button 136 is configured to direct water to the second user device, where the second user device is a tub spout. In other embodiments, the user interface 134 includes three buttons 136 (shown in FIG. 3B). The cover assembly 102 further includes a first control module 138 (e.g. control module 138). The control module 138 is coupled to an inside of the escutcheon plate 104. The control module 138 is also coupled to the buttons 136. As shown in FIGS. 1 and 2, the first solenoid valve 130 includes first solenoid valve wires 140 and the second solenoid valve 132 includes second solenoid valve wires 142. The first solenoid valve wires 140 and the second solenoid valve wires 142 couple to the control module 138, such that when the buttons 136 are pressed, the control module 138 controls (i) the closed position and the open position of the first solenoid valve 130 and (ii) the closed position and the open position of the second solenoid valve 132. In some embodiments, the buttons 136 may include images (e.g., icons, symbols, etc.) configured to depict which user devices are controlled by which buttons. For example, one button 136 may have a showerhead image and another button 136 may have a tub spout image.

Referring to FIGS. 2 and 4B, the cover assembly 102 further includes a first battery compartment 144 (e.g., battery compartment 144) and first batteries 146 (e.g., batteries 146). The battery compartment 144 houses (e.g., contain, etc.) the batteries 146 and create an electrical connection between the batteries 146 and the control module 138, such that the batteries 146 provide electrical power (e.g., electrical supply, etc.) to the control module 138. The batteries 146 also provide the first solenoid valve 130 and the second solenoid valve 132 with electrical power through control module 138, where the control module 138 controls a delivery of electric power from the batteries 146 to the first solenoid valve 130 and the second solenoid valve 132. In other embodiments, the first solenoid valve wires 140 and the second solenoid valve wires 142 are directly coupled to the battery compartment 144 such that the batteries 146 provide electrical power to the first solenoid valve 130 and the second solenoid valve 132 directly. In some embodiments, the cover assembly 102 (i) does not include the battery compartment 144 or the batteries 146 and (ii) is configured to receive electrical power from a power supply (e.g., an AC power supply, etc.), a solar panel, a water impeller, a turbine within flow of water, etc.

Figure 6:
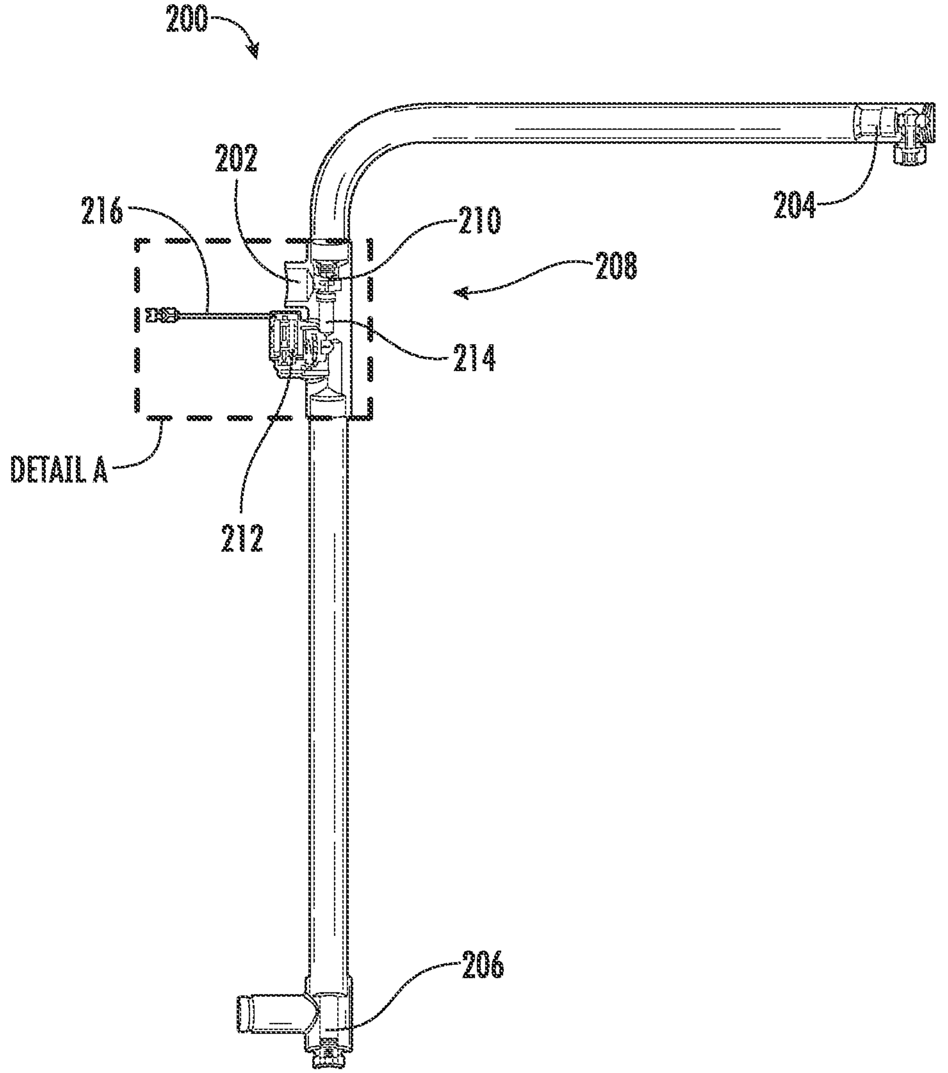
FIG. 6 is a cross-sectional view of an outlet addition assembly including a solenoid valve and diverter module, according to an example embodiment.
Figure 7:
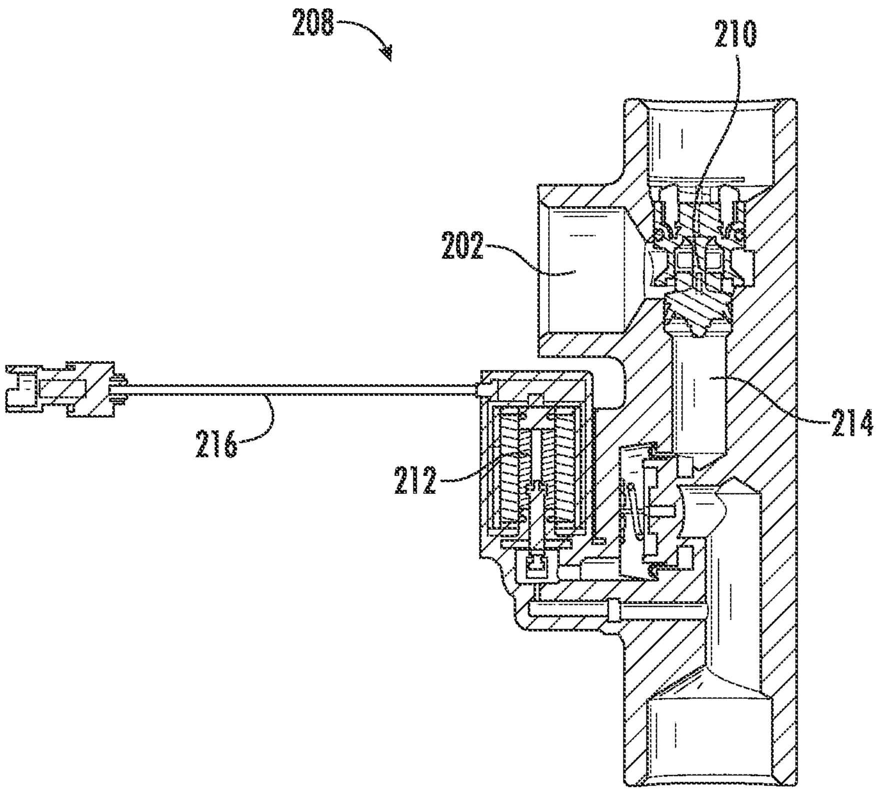
FIG. 7 is a view of Detail A in FIG. 6, according to an example embodiment.
Figure 8:
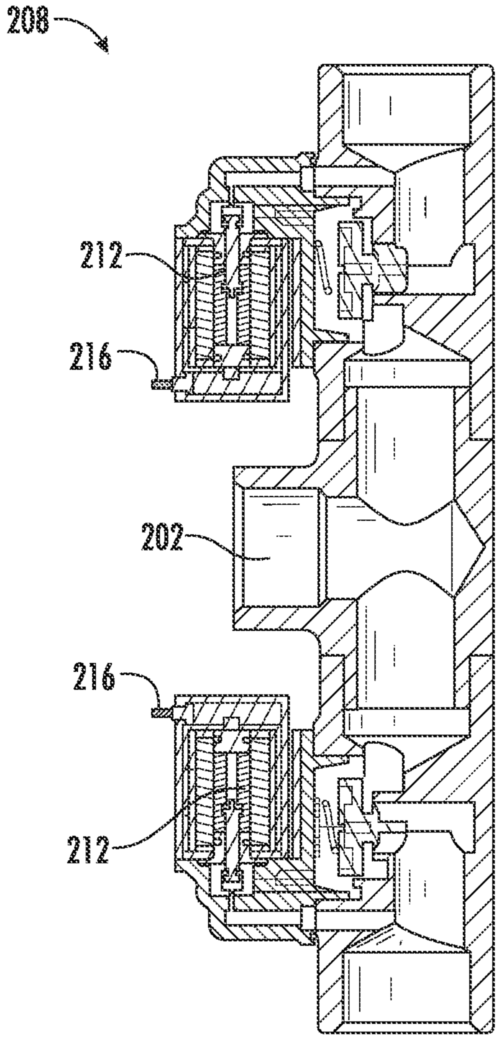
FIG. 8 is a cross-sectional view of the solenoid valve and diverter module, according to another example embodiment.

Referring to FIGS. 6-8, an outlet addition assembly 200 is shown, according to an example embodiment. The outlet addition assembly 200 is couples to a main valve body (e.g., the mechanical main valve body or the electromechanical main valve body 118) and functionally increase outlets of the main valve body by one. The outlet addition assembly 200 includes a first inlet 202 (e.g., inlet 202). The inlet 202 is configured to be fluidly coupled to (i) the first outlet 125, (ii) the second outlet 127, (iii) the third outlet 126, or (iv) the fourth outlet 128. The outlet addition assembly 200 includes a first additional outlet 204 and a second additional outlet 206. The first additional outlet 204 and the second additional outlet 206 are fluidly coupled to the inlet 202. In some embodiments, the first additional outlet 204 is fluidly coupled to the first user device and the second additional outlet 206 is fluidly coupled to a third user device, such that one of the first outlet 125, the second outlet 127, the third outlet 126, and the fourth outlet 128 is fluidly coupled to the second user device. In this embodiment, the first user device is a showerhead, the second user device is a tub spout, and the third user device is a handshower.

Still referring to FIGS. 6-8, the outlet addition assembly 200 also includes a solenoid valve and diverter module 208. The solenoid valve and diverter module 208 is fluidly coupled to the inlet 202, the first additional outlet 204, and the second additional outlet 206. The solenoid valve and diverter module 208 is configured to facilitate directing water through the outlet addition assembly 200. The solenoid valve and diverter module 208 includes a diverter 210 fluidly coupled to the inlet 202. The diverter 210 is configured to receive mixed water from the inlet 202. The solenoid valve and diverter module 208 also includes a third solenoid valve 212 disposed between the first additional outlet 204 and the second additional outlet 206 and configured to receive mixed water from the inlet 202 via the diverter 210. The third solenoid valve 212 is configured to selectively permit mixed water to flow through the first additional outlet 204 and the second additional outlet 206. For example, (i) when the third solenoid valve 212 is in a closed position, mixed water is allowed to flow through the first additional outlet 204 but mixed water is prevented from flowing through the second additional outlet 206, and (ii) when the third solenoid valve 212 is in an open position, mixed water is allowed to flow through the second additional outlet 206 but mixed water is prevented from flowing through the first additional outlet 204.

Referring to FIGS. 6 and 7, the solenoid valve and diverter module 208 further includes a bottom passage 214 (e.g., conduit, channel, etc.). The bottom passage 214 is downstream of the diverter 210 and upstream of the third solenoid valve 212. The bottom passage 214 facilitates a closed position and an open position of the diverter 210. For example, (i) when the third solenoid valve 212 is in an open position, mixed water from the inlet 202 passes through the bottom passage 214 via the diverter 210 such that the diverter 210 is in an open position allowing mixed water from the inlet 202 to flow through the third solenoid valve 212, and (ii) when the third solenoid valve 212 is in a closed position, mixed water from the inlet 202 fills up (e.g., fully occupies, etc.) the bottom passage 214 and switches the diverter 210 to a closed position through pressure applied to the diverter 210 by the water in the bottom passage 214, thereby preventing mixed water from the inlet 202 to flow through the third solenoid valve 212.

In some embodiments, the outlet addition assembly 200 is utilized in conjunction with the first shower assembly 100 and the electromechanical main valve body 118, such that the first shower assembly 100 that has two outlets can function as having three outlets. In this embodiment, the third outlet 126 or the fourth outlet 128 is fluidly coupled to the inlet 202. The third solenoid valve 212 includes third solenoid valve wires 216. The third solenoid valve wires 216 are coupled to the control module 138, such that the control module 138 (*i*) controls the closed position and the open position of the third solenoid valve 212 and (ii) provides electrical power to the third solenoid valve 212. Additionally, in this embodiment, there are three buttons 136 (as shown in FIG. 3B), such that one button 136 controls the first solenoid valve 130/second solenoid valve 132 via the control module 138 to direct water to the second user device, another button 136 controls the second solenoid valve 132/first solenoid valve 130 and the third solenoid valve 212 via the control module 138 to direct water to the first user device, and another button 136 controls the second solenoid valve 132/first solenoid valve 130 and the third solenoid valve 212 via the control module 138 to direct water to the third user device. In some embodiments, the first user device is a shower head, the second user device is a tub spout, and the third user device is a handshower. In other embodiments, the buttons 136 control a different combination of the first solenoid valve 130, the second solenoid valve 132, and the third solenoid valve 212 via the control module 138.

Referring to FIG. 8, in an example embodiment, the outlet addition assembly 200 excludes the diverter 210 and includes another third solenoid valve 212. Where the previous embodiment of the outlet addition assembly 200, shown in FIGS. 6 and 7, only allowed water to flow either to the first additional outlet 204 or the second additional outlet 206, this embodiment of the outlet addition assembly 200 allows water to flow to the first additional outlet 204, the second additional outlet 206, or both. Similar to the previous embodiment, in this embodiment, the third solenoid valve wires 216 are coupled to the control module 138 such that the control module 138 (i) controls the closed position and the open position of the third solenoid valves 212 and (ii) provides electrical power to the third solenoid valves 212. Additionally, in this embodiment, there are three buttons 136 (as shown in FIG. 3B) such that one button 136 controls the first solenoid valve 130/second solenoid valve 132 via the control module 138 to direct water to the second user device, another button 136 controls the second solenoid valve 132/first solenoid valve 130 and both the third solenoid valves 212 via the control module 138 to direct water to the first user device, and another button 136 controls the second solenoid valve 132/first solenoid valve 130 and both the third solenoid valves 212 via the control module 138 to direct water to the third user device. Alternatively, where the electromechanical main valve body includes only the solenoid valve 132 (as shown in FIGS. 5B and 5C), the third outlet 126 is fluidly coupled to the inlet 202 and there are three buttons 136 (shown in FIG. 3A) such that one button 136 controls the solenoid valve 132 via the control module 138 to direct water to the second user device, another button 136 controls the solenoid valve 132 and both the third solenoid valves 212 via the control module 138 to direct water to the first user device, and another button 136 controls the solenoid valve 132 and both the third solenoid valves 212 via the control module 138 to direct water to the third user device. In some embodiments, the first user device is a shower head, the second user device is a tub spout, and the third user device is a handshower. In this embodiment, the two buttons 136 that control the second solenoid valve 132/first solenoid valve 130 and both third solenoid valves 212 can be concurrently selected (e.g., pressed, etc.), such that water flows through both the first use device and the third user device. In other embodiments, the buttons 136 control a different combination of the first solenoid valve 130, the second solenoid valve 132, and the third solenoid valve 212 via the control module 138.

Referring to FIGS. 9-16, a second shower assembly 300 is shown, according to an example embodiment. The second shower assembly 300 is configured for use in the bathroom shower. The second shower assembly 300 includes a second cover assembly 302 (e.g., cover assembly 302). The cover assembly 302 is disposed along a front portion of the second shower assembly 300 and configured to provide a method for the user to communicate with the second shower assembly 300. The cover assembly 302 includes a second escutcheon plate 304 (e.g., escutcheon plate 304). The escutcheon plate 304 is disposed along a front portion of the cover assembly 302 and configured to partially cover and/or protect other components of the second shower assembly 300.

Still referring to FIGS. 9-16, the second shower assembly 300 further includes an outlet expansion module 306. The outlet expansion module 306 is disposed along a rear portion of the second shower assembly 300 and coupled to the cover assembly 302. The outlet expansion module 306 is configured to intake and direct mixed water within the bathroom shower. The outlet expansion module 306 includes a second inlet 308 (e.g., inlet 308). The inlet 308 is configured to intake mixed water from a water source or the main valve body. The outlet expansion module 306 includes a fifth outlet 310. The fifth outlet 310 is fluidly coupled to a fourth user device and configured to direct mixed water from the outlet expansion module 306 to the fourth user device via a hydraulic connection. The outlet expansion module 306 includes a sixth outlet 312. The sixth outlet 312 is fluidly coupled to a fifth user device and configured to direct mixed water from the outlet expansion module 306 to the fifth user device via a hydraulic connection. The outlet expansion module 306 also includes a seventh outlet 314. The seventh outlet 314 is fluidly coupled to a sixth user device and configured to direct mixed water from the outlet expansion module 306 to the sixth user device via a hydraulic connection.

Still referring to FIGS. 9-16, the outlet expansion module 306 includes a fifth solenoid valve 316. The fifth solenoid valve 316 is fluidly coupled to the fifth outlet 310. The fifth solenoid valve 316 is configured to selectively permit mixed water to flow through the fifth outlet 310. For example, (i) when the fifth solenoid valve 316 is in a closed position, mixed water is prevented from flowing through the fifth outlet 310, and (ii) when the fifth solenoid valve 316 is in an open position, mixed water is allowed to flow through the fifth outlet 310. The outlet expansion module 306 also includes a sixth solenoid valve 318. The sixth solenoid valve 318 is fluidly coupled to the sixth outlet 312. The sixth solenoid valve 318 is configured to selectively permit mixed water to flow through the sixth outlet 312. For example, (i) when the sixth solenoid valve 318 is in a closed position, mixed water is prevented from flowing through the sixth outlet 312, and (ii) when the sixth solenoid valve 318 is in an open position, mixed water is allowed to flow through the sixth outlet 312. The outlet expansion module 306 also includes a seventh solenoid valve 320. The seventh solenoid valve 320 is fluidly coupled to the seventh outlet 314. The seventh solenoid valve 320 is configured to selectively permit mixed water to flow through the seventh outlet 314. For example, (i) when the seventh solenoid valve 320 is in a closed position, mixed water is prevented from flowing through the seventh outlet 314, and (ii) when the seventh solenoid valve 320 is in an open position, mixed water is allowed to flow through the seventh outlet 314. In other embodiments, the outlet expansion module 306 includes more than three outlets (e.g., an eighth outlet, a ninth outlet, a tenth outlet, etc.).

Figure 9:
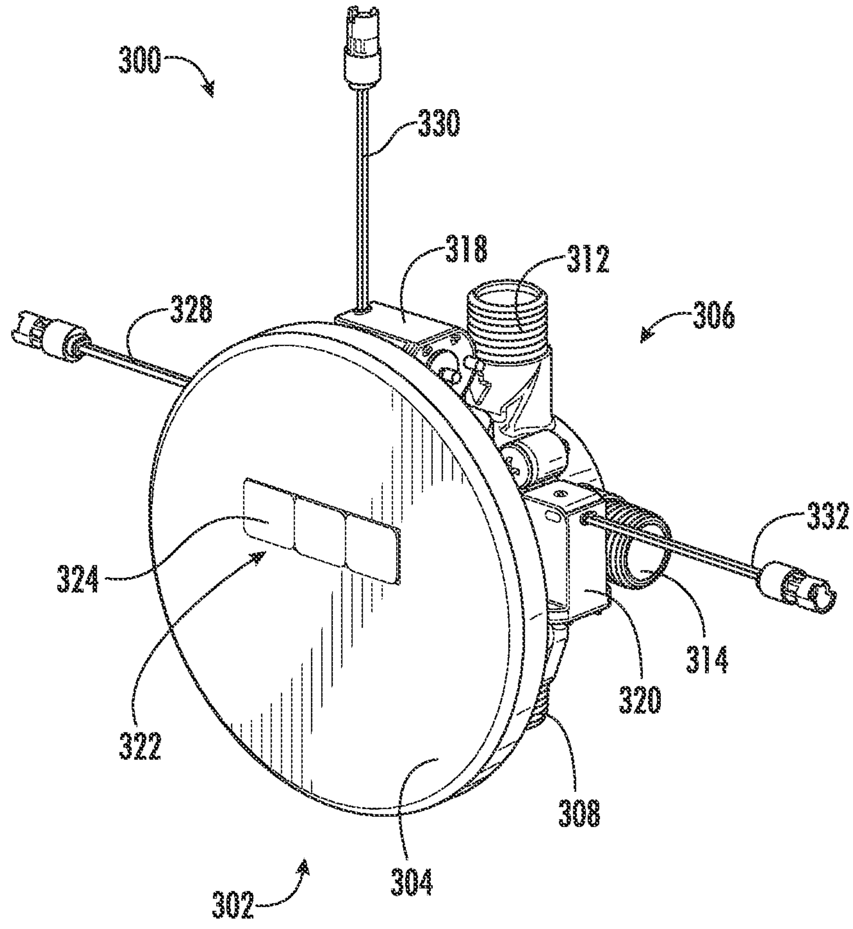
FIG. 9 is a front perspective view of a second shower assembly including an outlet expansion module, according to an example embodiment.
Figure 10:
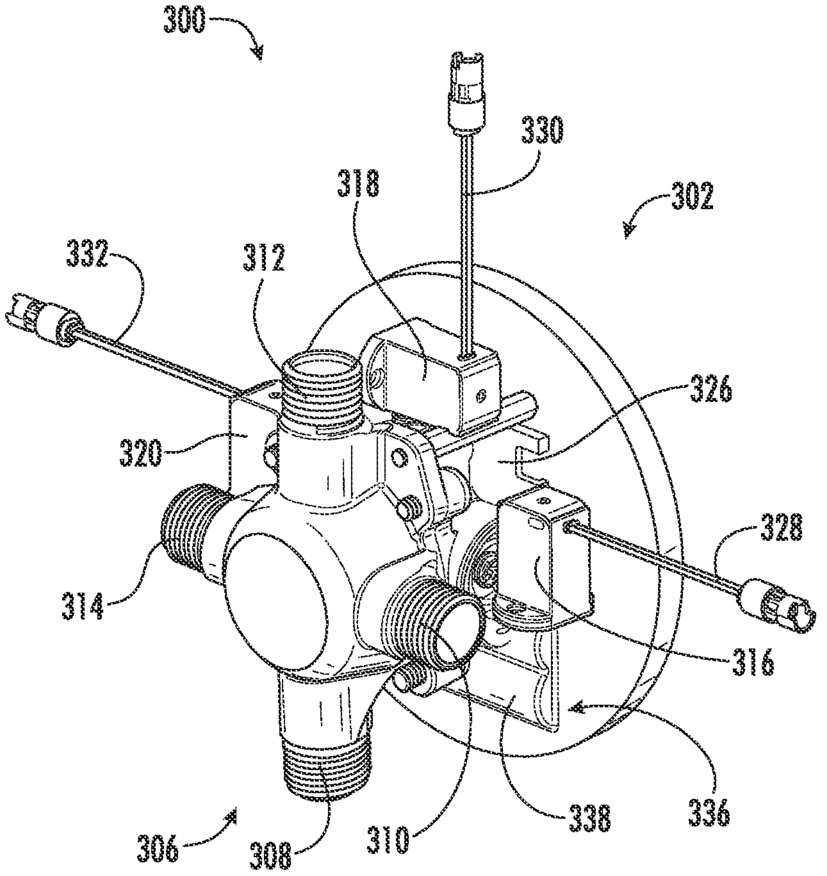
FIG. 10 is a rear perspective view of the second shower assembly of FIG. 9, according to an example embodiment.
Figure 11:
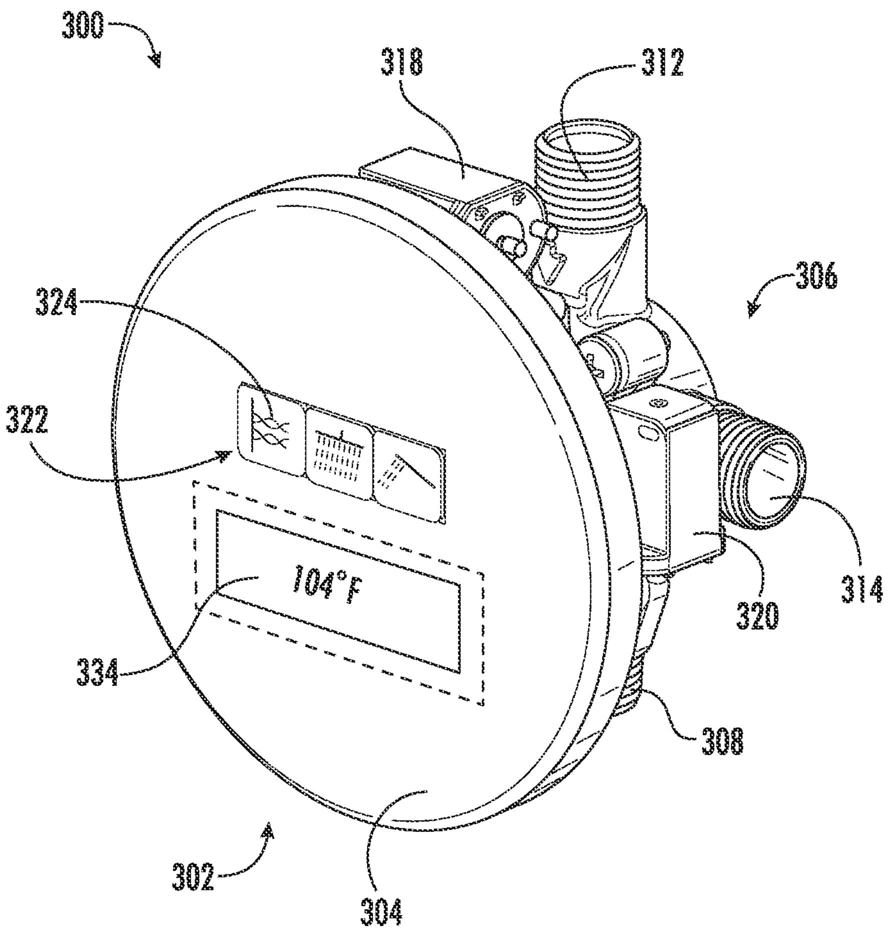
FIG. 11 is a front perspective view of the second shower assembly, according to another example embodiment.
Figure 14:
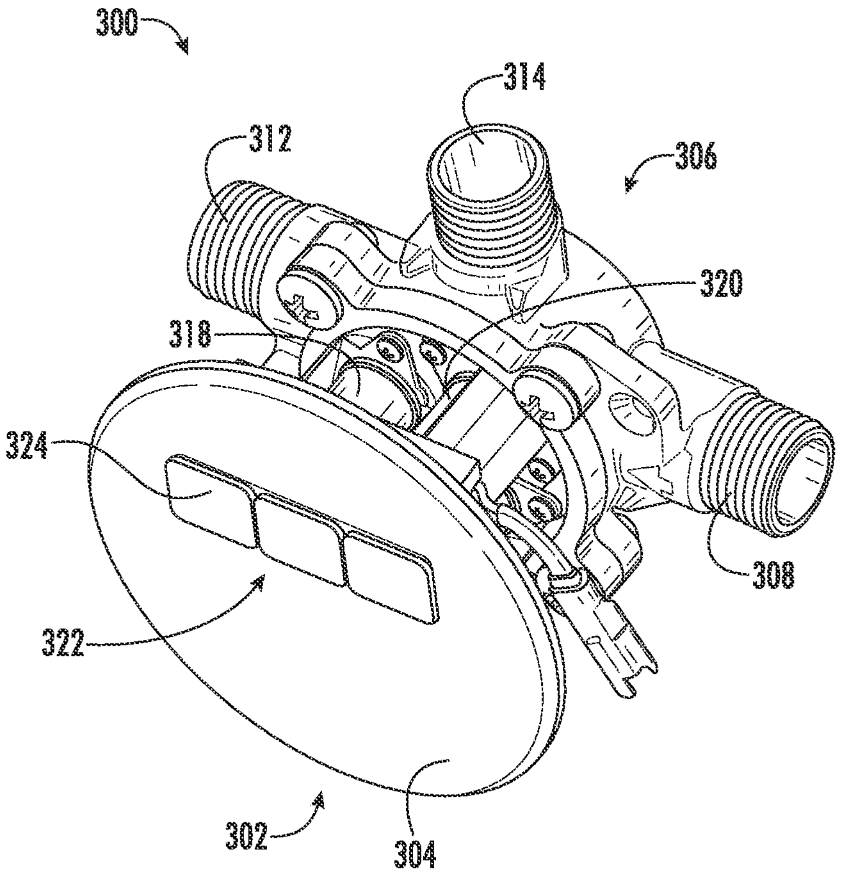
FIG. 14 is a front perspective view of the second shower assembly including a cover assembly and an escutcheon plate, according to another example embodiment.

Referring to FIGS. 9, 11, and 14, in some embodiments, the escutcheon plate 304 includes a second user interface 322 (e.g., user interface 322). The user interface 322 is disposed along a front portion of the escutcheon plate 304 and configured to provide the user with a method to communicate with the second shower assembly 300. The user interface 322 includes second buttons 324 (e.g., buttons 324). The buttons 324 are coupled to the escutcheon plate 304 and configured to provide the user with an option to switch between outlets of the outlet expansion module 306 (e.g., the fifth outlet 310, the sixth outlet 312, and the seventh outlet 314). In some embodiments, the user interface 322 includes three buttons 324. In this embodiment, one button 324 is configured to direct water to the fourth user device, another button 324 is configured to direct water to the fifth user device, and another button 324 is configured to direct water to the sixth user device. In this embodiment, the fourth user device is a showerhead, the fifth user device is a tub spout, and the sixth user device is a handshower. The cover assembly 302 further includes a second control module 326 (e.g., control module 326). The control module 326 is coupled to an inside of the escutcheon plate 304. The control module 326 is also coupled to the buttons 324. As shown in FIGS. 9 and 10, the fifth solenoid valve 316 includes fifth solenoid valve wires 328, the sixth solenoid valve 318 includes sixth solenoid valve wires 330, and the seventh solenoid valve 320 includes seventh solenoid valve wires 332. The fifth solenoid valve wires 328, the sixth solenoid valve wires 330, and the seventh solenoid valve wires 332 couple to the control module 326, such that when the buttons 324 are pressed, the control module 326 controls (i) the fifth solenoid valve 316 between the closed position and the open position, (ii) the sixth solenoid valve 318 between the closed position and the open position, and (iii) the seventh solenoid valve 320 between the closed position and the open position. In some embodiments, as shown in FIG. 11, the buttons 324 may include images configured to depict which user devices are controlled by which buttons. For example, one button 324 may have a bodyspray image, another button 324 may have a showerhead image, and another button 324 may have a handshower image.

Referring to FIG. 11, in some embodiments, the cover assembly 302 includes a display 334 (e.g., screen, etc.). The display is coupled to an outside of the escutcheon plate 304. In one embodiment, the display 334 displays (e.g., show, present, etc.) a water temperature flowing through outlets of the outlet expansion module 306. In another embodiment, the display 334 displays a shower time (e.g., time water has been running through outlets of the outlet expansion module 306.). In another embodiment, the display 334 displays the time and/or date of the current time and/or date. In another embodiment, the display 334 displays a selection made via pressing the buttons 324.

Figure 12:
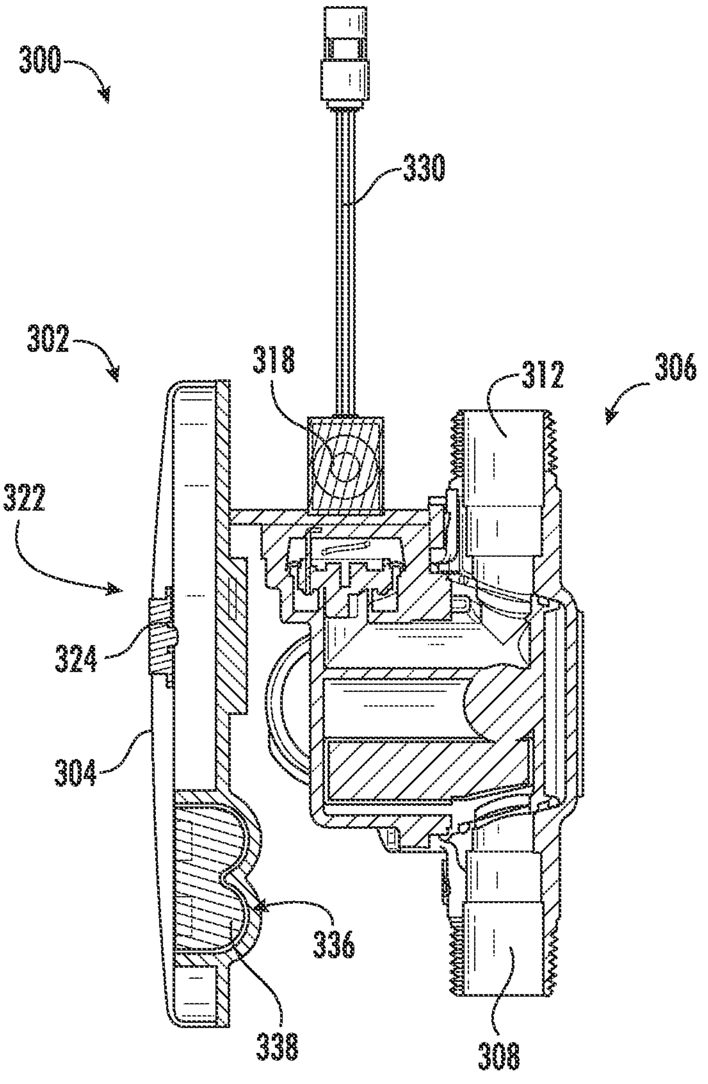
FIG. 12 is a cross-sectional view of the second shower assembly of FIGS. 9 and 10, according to an example embodiment.
Figure 13:
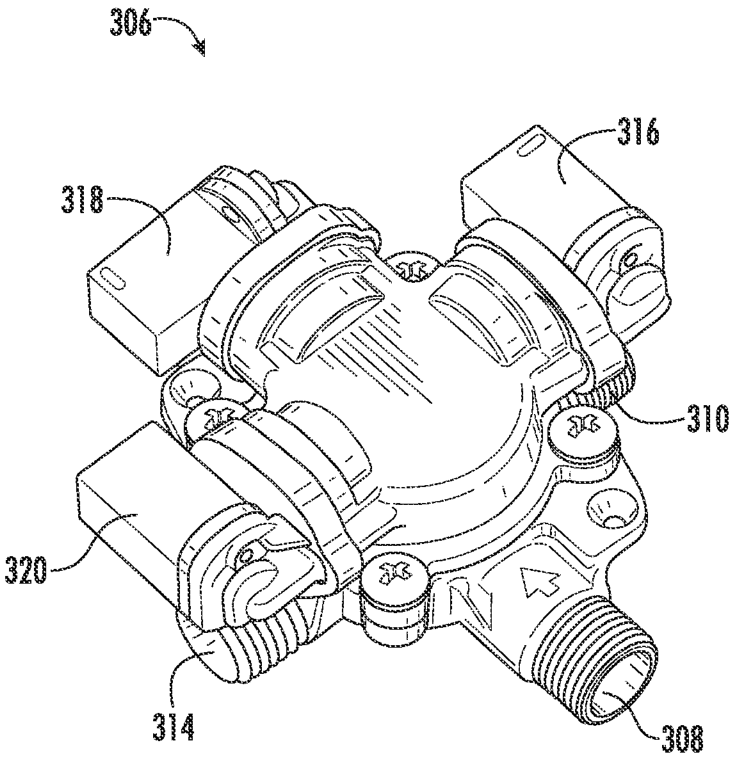
FIG. 13 is a rear perspective view of the outlet expansion module of FIGS. 9, 10 and 12, according to an example embodiment
Figure 15:
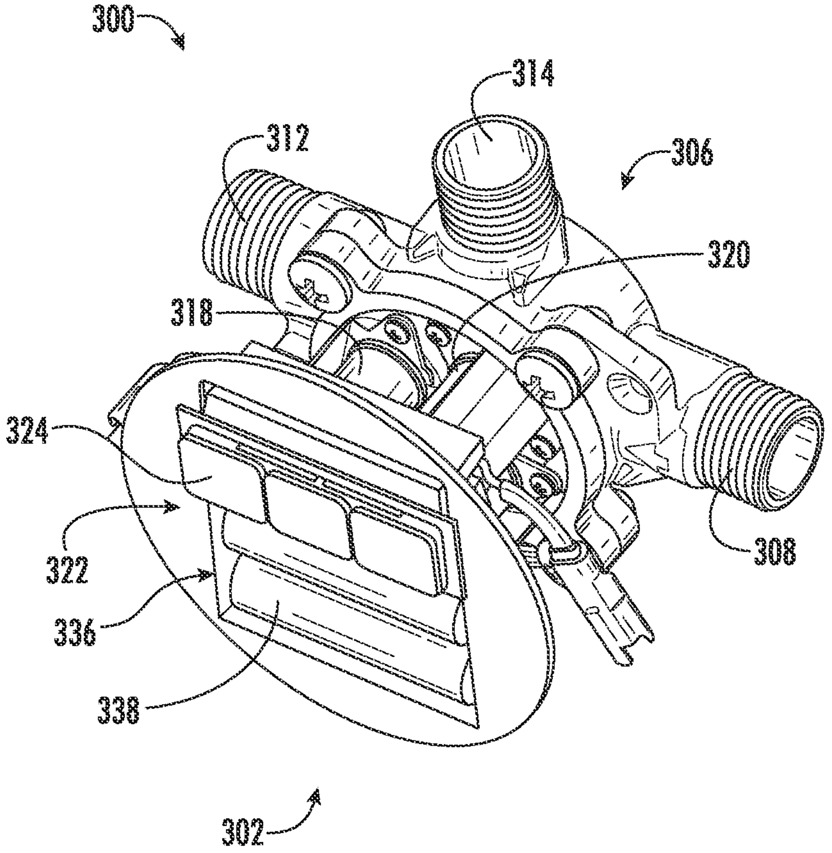
FIG. 15 is a front perspective view of the second shower assembly of FIG. 14 excluding the escutcheon plate, according to an example embodiment.
Figure 16:
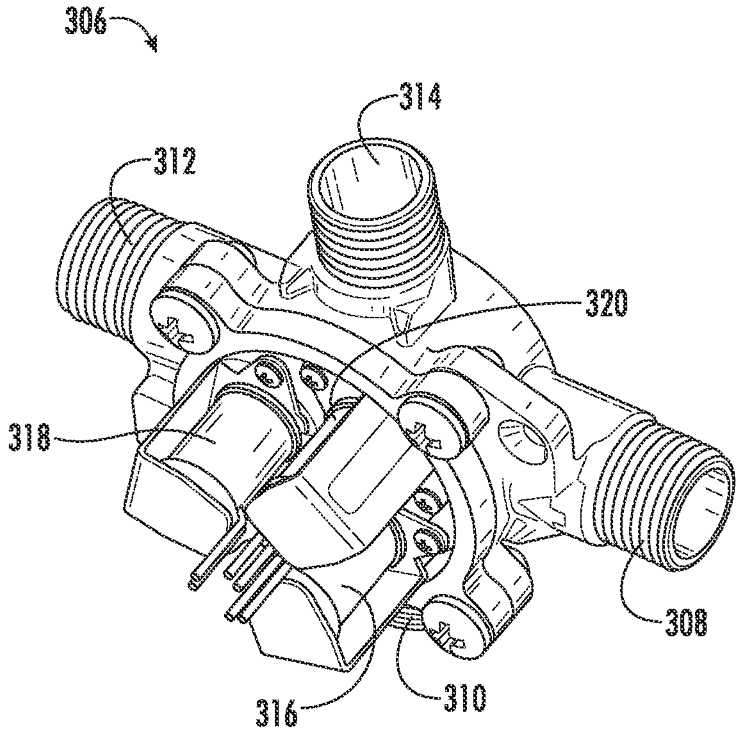
FIG. 16 is a front perspective view of the second shower assembly of FIGS. 14 and 15 excluding the cover assembly and the escutcheon plate, according to an example embodiment.

Referring to FIGS. 10, 12, and 15, the cover assembly 302 further includes a second battery compartment 336 (e.g., battery compartment 336) and second batteries 338 (e.g., batteries 338). The battery compartment 336 houses the batteries 338 and create an electrical connection between the batteries 338 and the control module 326, such that the batteries 338 provide the control module 326 with electrical power. The batteries 338 also provide the fifth solenoid valve 316, the sixth solenoid valve 318, and the seventh solenoid valve 320 with electrical power through the control module 326, where the control module 326 controls a delivery of electric power from the batteries 338 to the fifth solenoid valve 316, the sixth solenoid valve 318, and the seventh solenoid valve 320. In other embodiments, the fifth solenoid valve wires 328, the sixth solenoid valve wires 330, and the seventh solenoid valve wires 332 are directly coupled to the battery compartment 336, such that the batteries 338 provide electrical power to the fifth solenoid valve 316, the sixth solenoid valve 318, and the seventh solenoid valve 320 directly. In some embodiments, the cover assembly 302 (i) does not include the battery compartment 336 or the batteries 338 and (ii) is configured to receive electrical power from a power supply, a solar panel, a water impeller, a turbine within flow of water, etc.

In some embodiments, the second shower assembly 300 is utilized in conjunction with the first shower assembly 100 and the electromechanical main valve body 118, such that first shower assembly 100 that has two outlets can function as having four outlets. In this embodiment, the third outlet 126 or the fourth outlet 128 is fluidly coupled to the inlet 308. The combination of the first shower assembly 100 with the second shower assembly 300 allows for four different outlets that can be fluidly coupled to four different user devices. For example, the fourth outlet 128/third outlet 126 is fluidly coupled to the first user device, the fifth outlet 310 is fluidly coupled to the fourth user device, the sixth outlet 312 is fluidly coupled to the fifth user device, and the seventh outlet 314 is coupled to the sixth user device, wherein the third outlet 126/fourth outlet 128 is fluidly coupled to the inlet 308.

It is to be appreciated that the first user device, second user device, third user device, fourth user device, fifth user device, sixth user device, and seventh user device disclosed herein may be of an user devices for use in a shower, including a spout, a tub spout, a handshower, an additional showerhead, a rain panel, a bodyspray, etc.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.)

Although the figures and description may illustrate a specific order of method steps, the order of such steps may differ from what is depicted and described, unless specified differently above. Also, two or more steps may be performed concurrently or with partial concurrence, unless specified differently above.

It is important to note that any element disclosed in one embodiment may be incorporated or utilized with any other embodiment disclosed herein. For example, the first shower assembly 100 of the exemplary embodiment described in at least FIGS. 1-5C may be incorporated into the outlet addition assembly 200 of the exemplary embodiment described in at least FIGS. 6-8. As another example, the first shower assembly 100 of the exemplary embodiment described in at least FIGS. 1-5C may be incorporated with the second shower assembly 300 of the exemplary embodiment described in at least FIGS. 9-16. Although only some examples of an element from one embodiment that can be incorporated or utilized in another embodiment has been described above, it should be appreciated that other elements of the various embodiments may be incorporated or utilized with any of the other embodiments disclosed herein.

What is claimed:

1. A system for converting a mechanical main valve body of a shower assembly to an electromechanical main valve body, the system comprising:

a mechanical valve body comprising:
- a cold water inlet configured to receive cold water,
- a hot water inlet configured to receive hot water, and
- a connection interface configured to interchangeably receive one of the mechanical main valve body or the electromechanical main valve body;

wherein the electromechanical main valve body is couplable to the mechanical valve body, the electromechanical main valve body comprises:
- a first mixing valve sealingly engageable with the connection interface of the mechanical valve body, the first mixing valve configured to receive the cold water and the hot water and facilitate mixing of the cold water and the hot water in replacement of a second mixing valve of the mechanical main valve body, the first mixing valve comprising an outer surface,
- a first solenoid mount extending from the outer surface,
- a first solenoid valve mechanically coupled to the first solenoid mount, the first solenoid valve fluidly coupled to a first outlet configured to direct mixed water to a first user device in replacement of a second outlet of the mechanical main valve body, the first solenoid valve configured to selectively permit the mixed water to flow through the first outlet,
- a second solenoid mount extending from the outer surface, and
- a second solenoid valve mechanically coupled to the second solenoid mount, the second solenoid valve fluidly coupled to a third outlet configured to direct the mixed water to a second user device in replacement of a fourth outlet of the mechanical main valve body, the second solenoid valve configured to selectively permit the mixed water to flow through the third outlet.

2. The system of claim 1, wherein the electromechanical main valve body further comprises:
- a first base sealingly engageable with the connection interface in replacement of a second base of the mechanical main valve body; and
- a drive coupled to the first mixing valve and configured to control the mixing of the cold water and the hot water in the first mixing valve.

3. The system of claim 1, wherein the shower assembly comprises a cover assembly comprising:

a battery compartment configured to receive one or more batteries operable to provide an electric power to the first solenoid valve and the second solenoid valve;

an escutcheon plate; and a control module configured to selectively control a delivery of the electric power from the one or more batteries to the first solenoid valve and the second solenoid valve.

4. The system of claim 3, wherein the escutcheon plate comprises a user interface configured to provide a user with a method to communicate with the shower assembly, the user interface comprising one or more buttons configured to provide the user with an option to switch a water outlet between the first outlet and the third outlet.

5. The system of claim 1, wherein the electromechanical main valve body is substantially free of wiring to an external power source.

6. The system of claim 1, wherein the shower assembly is operable to be installed as a self-contained, wireless unit entirely within a wall of a shower compartment.

7. The system of claim 1, wherein:

the mechanical valve body is an in-situ mechanical valve body; and the mechanical main valve body can be replaced with the electromechanical main valve body without removing or replacing the in-situ mechanical valve body.

8. The system of claim 1, further comprising a solenoid valve and diverter module configured to selectively deliver the mixed water to a third user device, the solenoid valve and diverter module comprising a third solenoid valve disposed between the third outlet and the first user device and electrically coupled to one or more batteries.

9. The system of claim 8, wherein upon energizing the third solenoid valve, the mixed water is diverted to the third user device.

10. The system of claim 1, further comprising an outlet expansion module, the outlet expansion module comprising:

an inlet for coupling to one of the first outlet or the third outlet;

a fifth outlet coupled to a third solenoid valve configured to direct the mixed water to a third user device;

a sixth outlet coupled to a fourth solenoid valve configured to direct the mixed water to a fourth user device; and a seventh outlet coupled to a fifth solenoid valve configured to direct the mixed water to a fifth user device.

11. A system for converting a mechanical main valve body of a shower assembly to an electromechanical main valve body, the system comprising:

a mechanical valve body comprising:

a cold water inlet configured to receive cold water, a hot water inlet configured to receive hot water, and a connection interface configured to interchangeably receive one of the mechanical main valve body or the electromechanical main valve body;

wherein the shower assembly comprises an escutcheon plate; and wherein the electromechanical main valve body is couplable to the mechanical valve body, the electromechanical main valve body comprises:

a first solenoid valve disposed between the mechanical valve body and the escutcheon plate, the first solenoid valve fluidly coupled to a first outlet configured to direct mixed water to a first user device in replacement of a second outlet of the mechanical main valve body, the first solenoid valve configured to selectively permit the mixed water to flow through the first outlet, and a second solenoid valve disposed between the mechanical valve body and the escutcheon plate, the second solenoid valve fluidly coupled to a third outlet configured to direct the mixed water to a second user device in replacement of a fourth outlet of the mechanical main valve body, the second solenoid valve configured to selectively permit the mixed water to flow through the third outlet.

12. The system of claim 11, wherein:

the first solenoid valve is disposed between the first outlet and the escutcheon plate; and the second solenoid valve is disposed between the third outlet and the escutcheon plate.

13. The system of claim 11, wherein, in a planar view, the first solenoid valve overlaps at least a portion of the first outlet.

14. The system of claim 13, wherein, in the planar view, the second solenoid valve overlaps at least a portion of the third outlet.

15. The system of claim 11, wherein the shower assembly further comprises a control module coupled to the escutcheon plate, the control module configured to selectively control a delivery of an electric power to the first solenoid valve and the second solenoid valve.

16. The system of claim 15, wherein, in a planar view, the control module overlaps at least a portion of the first solenoid valve.

17. The system of claim 15, wherein, in a planar view, the control module overlaps at least a portion of the first outlet.

18. The system of claim 11, wherein the shower assembly further comprises a battery compartment coupled to the escutcheon plate, the battery compartment configured to receive one or more batteries operable to provide an electric power to the first solenoid valve and the second solenoid valve.

19. The system of claim 18, wherein, in a planar view, the battery compartment overlaps at least a portion of the second solenoid valve.

20. The system of claim 18, wherein, in a planar view, the battery compartment overlaps at least a portion of the third outlet.

* * * * *